United States Patent
Ballard et al.

(10) Patent No.: US 10,543,865 B1
(45) Date of Patent: Jan. 28, 2020

(54) STROLLER CHANGING TABLE

(71) Applicants: Megan Elizabeth Ballard, Whitney Point, NY (US); Matthew Edward Hall, Toomsuba, MS (US)

(72) Inventors: Megan Elizabeth Ballard, Whitney Point, NY (US); Matthew Edward Hall, Toomsuba, MS (US)

( * ) Notice: Subject to any disclaimer, the term of this patent is extended or adjusted under 35 U.S.C. 154(b) by 0 days.

(21) Appl. No.: 15/724,277

(22) Filed: Oct. 4, 2017

(51) Int. Cl.
*A47D 5/00* (2006.01)
*B62B 9/12* (2006.01)
*B62B 9/10* (2006.01)

(52) U.S. Cl.
CPC ............... *B62B 9/12* (2013.01); *A47D 5/006* (2013.01); *B62B 9/102* (2013.01)

(58) Field of Classification Search
CPC .. B62B 9/12; B62B 9/102; A47D 5/00; A47D 5/006
See application file for complete search history.

(56) References Cited

U.S. PATENT DOCUMENTS

| | | | | |
|---|---|---|---|---|
| 2,645,782 A | * | 7/1953 | Kennedy | A47K 3/064 4/572.1 |
| 2,963,714 A | * | 12/1960 | Martin | A47D 5/006 5/430 |
| 3,269,621 A | * | 8/1966 | Dishart | A47D 13/02 224/585 |
| 3,330,575 A | * | 7/1967 | Boudreau | B62B 7/10 280/648 |
| 3,659,297 A | * | 5/1972 | Schutz | A47D 5/006 5/655 |
| 3,721,434 A | * | 3/1973 | Spies | A47D 5/006 128/870 |
| 4,123,809 A | * | 11/1978 | Pugh | A47D 5/006 4/551 |
| 4,133,063 A | * | 1/1979 | Jones-Steele | A47D 5/006 5/424 |
| 4,602,395 A | * | 7/1986 | Kassai | B62B 7/123 280/47.4 |
| 4,723,300 A | * | 2/1988 | Aranow | A45C 7/00 190/1 |
| 4,741,056 A | * | 5/1988 | Kassai | B62B 7/123 280/47.4 |
| 4,935,973 A | * | 6/1990 | Behrman | A47D 5/00 5/2.1 |
| 5,234,224 A | * | 8/1993 | Kim | B62B 7/12 280/30 |
| 5,265,289 A | * | 11/1993 | Swiger | A47D 5/006 190/2 |

(Continued)

FOREIGN PATENT DOCUMENTS

| | | | | |
|---|---|---|---|---|
| GB | 2536667 A | * | 9/2016 | ............. D06F 81/06 |
| GB | 2537136 A | * | 10/2016 | ............. B60N 3/001 |

*Primary Examiner* — Jacob B Meyer
(74) *Attorney, Agent, or Firm* — The Iwashko Law Firm, PLLC; Lev Ivan Gabriel Iwashko

(57) ABSTRACT

A portable changing table including a foldable board having a first section and a second section, and at least one attachment device secured to the board, such that the board has a folded position and an unfolded position, such that in the folded position the first section folds flat against the second section, and such that in the unfolded position, the first section and the section lay flat adjacent to one another to form a rectangular surface.

12 Claims, 5 Drawing Sheets

(56) References Cited

U.S. PATENT DOCUMENTS

| | | | | |
|---|---|---|---|---|
| 5,375,869 A * | 12/1994 | Hsiao | A47D 1/02 | 280/31 |
| 5,778,465 A * | 7/1998 | Myers | A47D 7/04 | 5/93.1 |
| 6,125,487 A * | 10/2000 | Ive | A47D 5/006 | 5/603 |
| 6,272,704 B1 * | 8/2001 | Cutler | A47D 5/006 | 5/420 |
| 6,389,624 B1 * | 5/2002 | Madole | A47D 5/006 | 5/424 |
| 6,543,070 B2 * | 4/2003 | Longenecker | A47D 5/006 | 5/655 |
| 6,981,289 B2 * | 1/2006 | Mueller | A47D 5/006 | 206/440 |
| 7,065,814 B2 * | 6/2006 | Rutkowski | A47D 5/006 | 128/876 |
| 7,347,442 B1 * | 3/2008 | Carter | B62B 9/00 | 280/642 |
| 7,389,897 B2 * | 6/2008 | Pistiolis | A45C 9/00 | 224/158 |
| 7,618,055 B2 * | 11/2009 | Chuah | A47D 5/006 | 280/47.41 |
| 7,798,516 B2 * | 9/2010 | Homan | A47D 5/006 | 280/30 |
| 8,028,358 B2 * | 10/2011 | Fiore, Jr. | A47D 5/006 | 5/503.1 |
| 8,151,389 B1 * | 4/2012 | Lando | A47D 5/006 | 5/655 |
| 8,316,490 B1 * | 11/2012 | Bilak | A47D 5/006 | 5/655 |
| 8,480,114 B1 * | 7/2013 | Grantz | A47D 5/006 | 280/642 |
| 8,490,230 B2 * | 7/2013 | Rovin | A47D 5/006 | 190/2 |
| 8,556,343 B2 * | 10/2013 | Rubinshteyn | A47C 31/113 | 297/219.12 |
| 8,657,326 B2 * | 2/2014 | Shaanan | B62B 7/142 | 280/47.38 |
| 8,763,182 B2 * | 7/2014 | Schambon | A47D 5/006 | 5/417 |
| 8,973,757 B2 * | 3/2015 | Fimbrez | A45C 9/00 | 190/2 |
| 9,095,225 B2 * | 8/2015 | Behrman | A47D 5/00 | |
| 9,232,862 B1 * | 1/2016 | Arch | A47D 5/006 | |
| 9,345,338 B1 * | 5/2016 | Arch | A47D 5/006 | |
| 9,668,589 B2 * | 6/2017 | Cortez | A47D 5/00 | |
| 9,826,809 B2 * | 11/2017 | Carter | A45C 9/00 | |
| 9,907,410 B2 * | 3/2018 | Roberts Moosa | A47D 5/003 | |
| 9,924,806 B2 * | 3/2018 | Penello | A47D 5/006 | |
| 9,939,811 B1 * | 4/2018 | Fitzpatrick | A47D 5/006 | |
| 10,039,395 B2 * | 8/2018 | Holmes | A47D 13/083 | |
| 10,111,536 B2 * | 10/2018 | Bezuidenhout | A47D 5/006 | |
| 10,160,363 B2 * | 12/2018 | Aguilar Ruelas | B60N 2/90 | |
| 10,178,916 B2 * | 1/2019 | Villei | A47D 15/005 | |
| 2002/0166169 A1 * | 11/2002 | Longenecker | A47D 5/006 | 5/93.1 |
| 2003/0097713 A1 * | 5/2003 | Kinchen | A47C 16/04 | 5/652 |
| 2004/0177446 A1 * | 9/2004 | Robb | A47D 1/103 | 5/655 |
| 2004/0211003 A1 * | 10/2004 | Stackman | A47D 5/006 | 5/655 |
| 2005/0210593 A1 * | 9/2005 | Stackman | A47D 5/006 | 5/655 |
| 2007/0138845 A1 * | 6/2007 | Gold | B60N 2/2812 | 297/200 |
| 2007/0170674 A1 * | 7/2007 | Chuah | A47D 5/006 | 280/47.38 |
| 2008/0290707 A1 * | 11/2008 | Schramek-Flye | A47D 1/103 | 297/255 |
| 2009/0178203 A1 * | 7/2009 | Homan | A47D 5/006 | 5/655 |
| 2010/0058535 A1 * | 3/2010 | Fiore, Jr. | A47D 5/006 | 5/93.1 |
| 2011/0163520 A1 * | 7/2011 | Fair | A63H 33/006 | 280/658 |
| 2011/0232000 A1 * | 9/2011 | Rodriguez | A47D 5/006 | 5/655 |
| 2011/0314608 A1 * | 12/2011 | Rovin | A47D 5/006 | 5/655 |
| 2012/0030877 A1 * | 2/2012 | Beck | A47D 15/003 | 5/655 |
| 2012/0192355 A1 * | 8/2012 | Manzanares | A47C 4/286 | 5/655 |
| 2012/0286549 A1 * | 11/2012 | Fair | B62B 9/108 | 297/219.12 |
| 2012/0317722 A1 * | 12/2012 | Pary | A47D 5/003 | 5/485 |
| 2013/0009434 A1 * | 1/2013 | Rubinshteyn | A47C 31/113 | 297/220 |
| 2013/0312197 A1 * | 11/2013 | Sanders | A47D 5/00 | 5/655 |
| 2014/0047643 A1 * | 2/2014 | Shadburn | A47D 5/006 | 5/655 |
| 2014/0091007 A1 * | 4/2014 | Garside | A47D 5/006 | 206/581 |
| 2014/0125020 A1 * | 5/2014 | Sime | A47D 5/00 | 280/47.4 |
| 2015/0082538 A1 * | 3/2015 | Fiore, Jr. | A47D 9/005 | 5/93.1 |
| 2015/0089745 A1 * | 4/2015 | Behrman | A47D 15/00 | 5/655 |
| 2015/0128349 A1 * | 5/2015 | Padilla | A47D 5/006 | 5/655 |
| 2015/0135443 A1 * | 5/2015 | Cortez | A47D 15/00 | 5/655 |
| 2016/0128491 A1 * | 5/2016 | Martiniuk | A47D 13/025 | 280/47.41 |
| 2016/0213165 A1 * | 7/2016 | Behrman | A47D 5/006 | |
| 2017/0055721 A1 * | 3/2017 | Penello | A47D 5/006 | |
| 2017/0127852 A1 * | 5/2017 | Escajeda | A47D 5/006 | |
| 2017/0156510 A1 * | 6/2017 | Roberts Moosa | A47D 5/003 | |
| 2017/0303701 A1 * | 10/2017 | Degon | A47D 5/006 | |
| 2018/0078050 A1 * | 3/2018 | Villei | A47D 5/006 | |
| 2018/0168364 A1 * | 6/2018 | Penello | A47D 5/006 | |
| 2019/0053635 A1 * | 2/2019 | Cheung | A47D 5/006 | |

* cited by examiner

STROLLER CHANGING TABLE

FIELD OF THE INVENTION

This invention relates generally to portable changing tables for young children; and in particular, to portable changing tables that can be transported in and fastened to a stroller.

BACKGROUND

Parents with small babies and toddlers often feel limited in their ability to go outdoors and travel with their babies as many places of entertainment, restaurants, and other establishments do not offer changing tables. Diaper bags often come equipped with a portable pad to be used to change children's diapers on, but these pads are soft and flexible, thereby making them usable only on firm, flat surfaces. Used alone, the portable changing pads do not provide sufficient rigidity to allow parents to use them in many situations. Using a rigid board or other surface is not practical, as it would not be easily portable. An easily transportable and portable changing table that would allow parents to go out with their young children without worrying about whether they will be able to find suitable facilities to change their children is needed.

SUMMARY

The stroller changing table is a changing table that is portable and foldable. It is easy to transport when the user brings a child out in a stroller. The stroller changing table can be folded up so that it can fit into a compartment under a stroller seat.

In an embodiment, the stroller changing table includes a foldable board having a first section and a second section; and at least one attachment device secured to the board. The board may have a folded position and an unfolded position. In the folded position, the first section of the board may fold flat against the second section. In the unfolded position, the first section and the second section lay flat adjacent to one another to form a rectangular surface. The first section and the section may be generally of the same shape and size. In an embodiment, the first section and the second may each be about 1.5 feet by 1.5 feet (46 cm by 46 cm), and, in an unfolded position, the board may be about 1.5 feet by three feet (46 cm by 92 cm). The board may have a padded surface. The board may have a waterproof surface.

In an embodiment, the at least one attachment device is configured to secure the board to a stroller. The at least one attachment device may be configured to be attached to at least one mating attachment device disposed on a stroller. In an embodiment, the board may additionally include straps secured to the board; where the straps are configured to be used to secure a child to the board.

In an embodiment, a stroller with a portable changing table includes a stroller comprising a seat having two sides and at least two armrests; a net suspended below at least a portion of the seat; a foldable board having a first section, a second section, and at least one attachment device secured to the board; where the board may have a folded position and an unfolded position. In the folded position, the first portion of the board may fold flat against the second section of the board; in the unfolded position, the first section and the second section may lay flat adjacent to one another to form a rectangular surface. The board may be configured to fit within the net when the board is in a folded position. The armrests may extend parallel to and higher than at least a portion of the sides of the seat. The net may be secured to and suspended below at least a portion of the seat. A plurality of attachment devices may be secured to the armrests; the attachment devices may be configured to mate with the attachment devices on the board, thereby allowing the board to be secured to the armrests.

DETAILED DESCRIPTION

The stroller changing table may provide consumers with a device which allows parents and/or caregivers to always have a portable changing table on hand. Referring now to FIGS. 1-4, the stroller changing table is a portable changing table that is made from a stiff but lightweight board. The board may be folded in half and stored under the stroller when not in use. The board can be secured to the armrests of a seat of a stroller. The board may also include straps to secure it firmly in place on the stroller. The stroller changing table may also include straps to secure the baby gently but firmly while he/she is being changed. The stroller changing table can be easily transported, allowing parents to change their babies while they are outdoors, running errands, going on outings, or travelling. The stroller changing table is designed for easy storage when not in use, and can be stored under the seat of a stroller.

Figure 1:
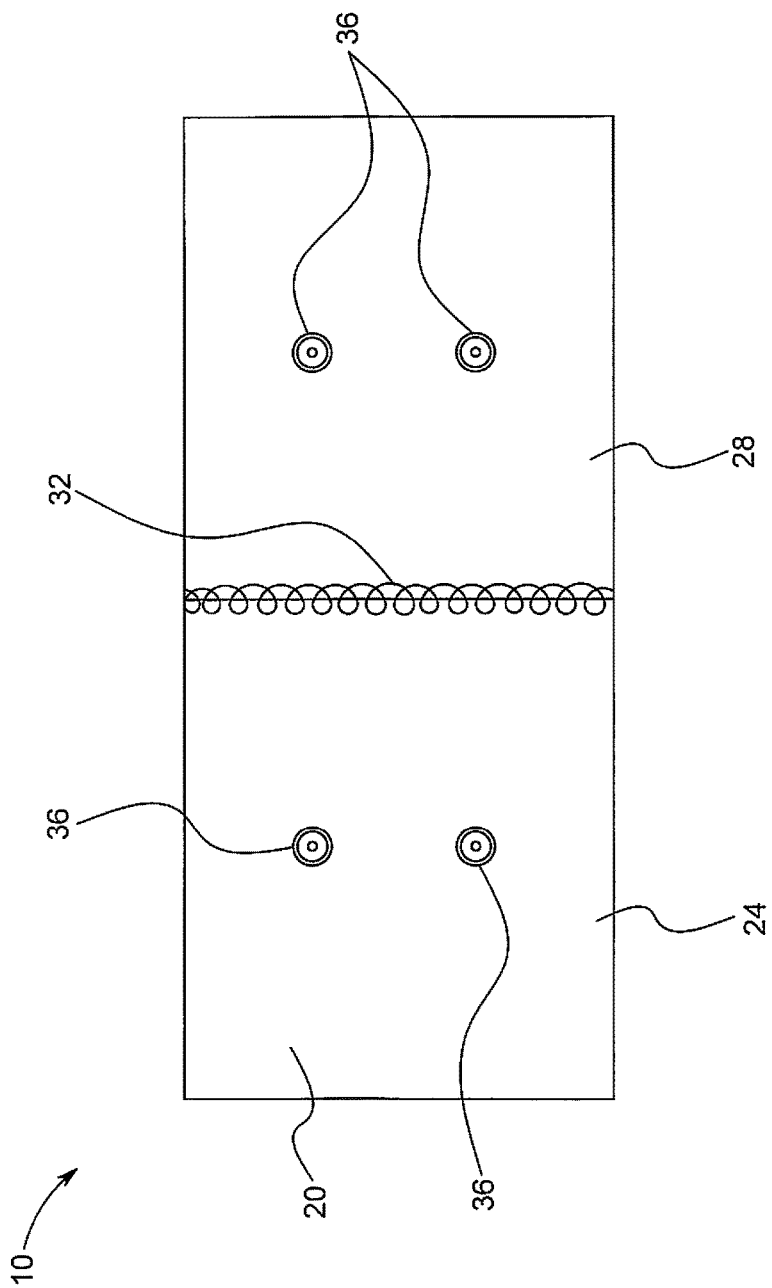
FIG. 1 is a top view of the board of the portable changing table, where the board is in an unfolded position.

Referring now to FIG. 1, the stroller changing table 10 includes a sturdy board 20, having a first section 24 and a second section 28. First section 24 and second section 28 of board 20 may be generally the same shape and size. First section 24 and second section 28 may be generally rectangular or square. In an embodiment, first section 24 and second section 28 are each about 18 inches by 18 inches (46 cm by 46 cm), although other dimensions may be used.

Figure 2:
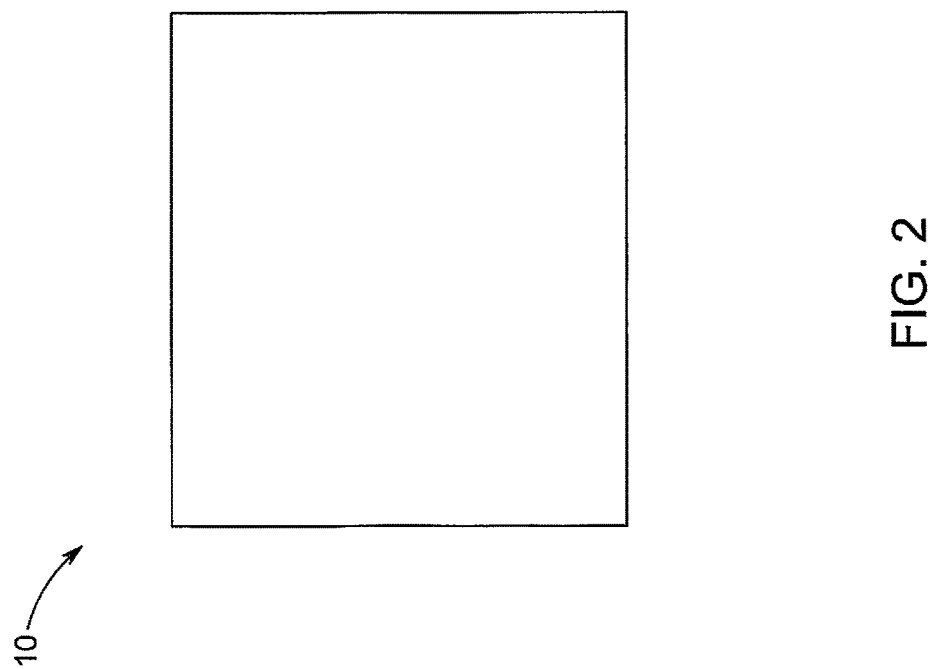
FIG. 2 is a top view of the board of the portable changing table, wherein the board is in a folded position.
Figure 3:
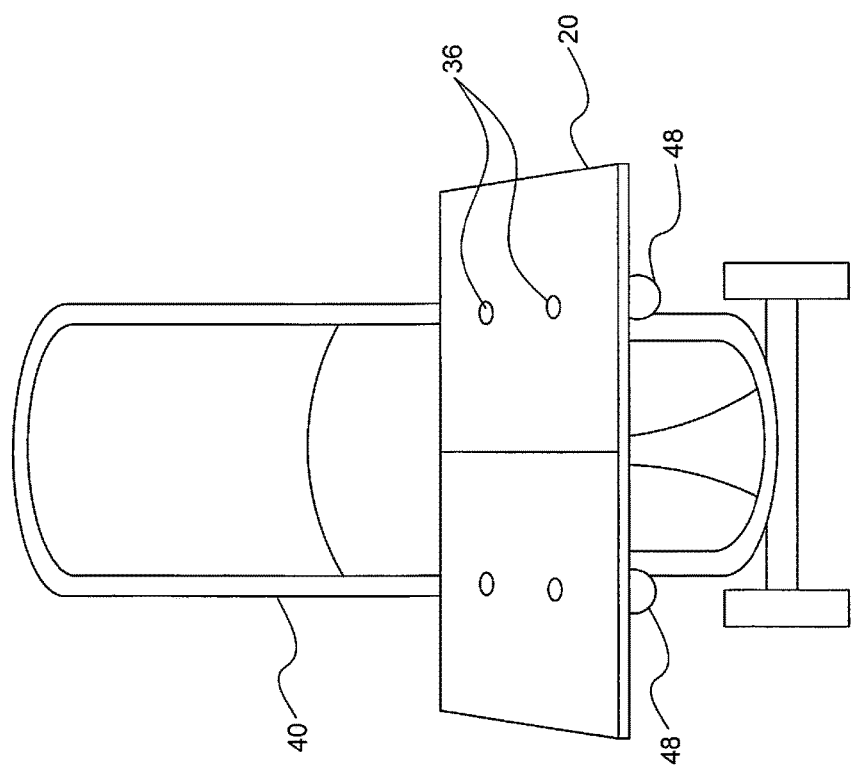
FIG. 3 is a front view of a stroller with the portable changing table secured to the armrests of the stroller.
Figure 4:
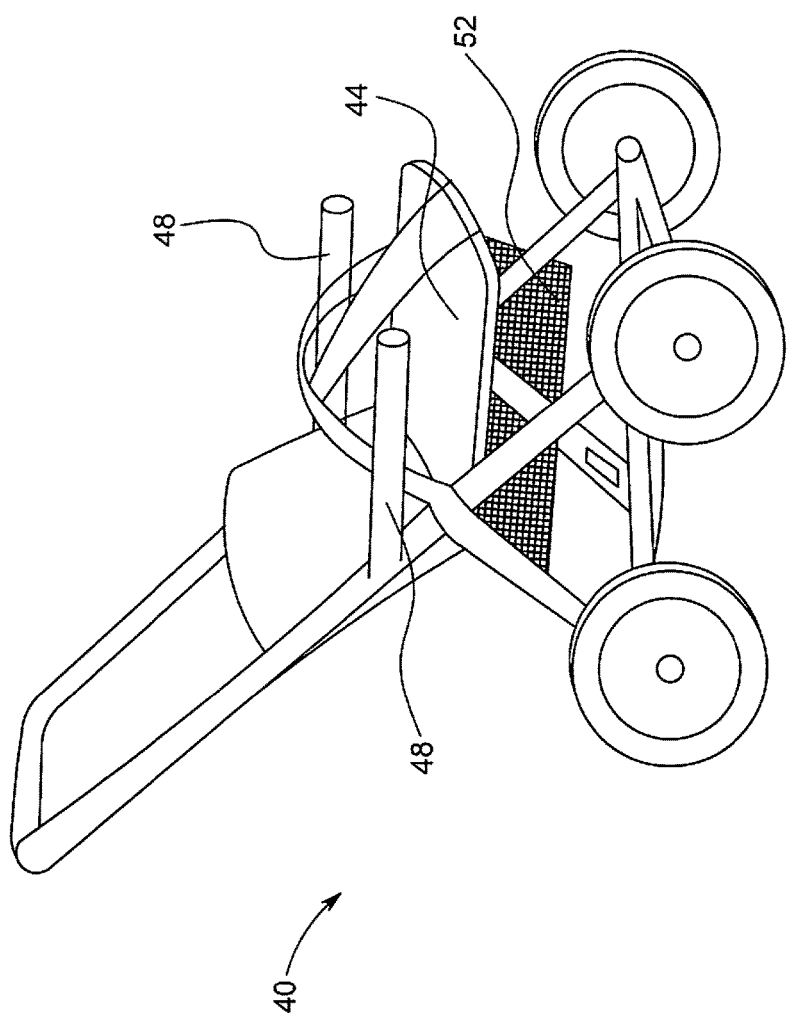
FIG. 4 is a perspective view of a stroller with a net for storing the portable changing table.

Hinge 32 may extend between first section 24 and second section 28. Hinge 32 may allow first section 24 and second section 28 to fold together into a folded position, or to extend to lay adjacent to one another with hinge 32 extending between them, in an unfolded position, as shown in FIG. 2. When laid flat in an unfolded position, board 20 may be stable and sturdy enough to lay a small child on.

Board 20 may be made of plastic or other sturdy material. The surface of board 20 may be padded or cushioned to make board 20 comfortable for a child laid on the board. The surface of board 20 may be waterproof.

Board 20 may have one or a plurality of attachment mechanisms 36. The attachment mechanisms 36 may be snaps, clips, straps, pegs, hooks, hook and loop fabric, or combinations of these, or other methods for attaching. Attachment mechanisms 36 may extend from one or both of first section 24 and second section 28 of board 20. Attachment mechanisms 36 may be configured to secure board 20 to a stroller 40. In an embodiment, attachment mechanisms attach to mating attachment mechanisms on stroller 40.

Stroller 40 may have a seat 44. Seat 44 may have a front, back, and two sides. Armrests 48 may extend generally parallel to and above the sides of seat 44. Attachment mechanisms 36 may secure board 20 to armrests 48 of stroller 40 when board is in an unfolded position. When secured in position on armrests 48 of stroller 40, board may be held in position so that it will remain flat and will not fold, thereby making board 20 safe to rest a child on.

A storage unit 50 may be disposed below seat 44 of stroller 40. The storage unit 40 may be secured to seat 44, and may be secured to at least two sides of seat 44. In an embodiment, the storage unit 50 may be secured to three sides of seat 44.

The storage unit 50 may include a net 52 (e.g., a flexible fabric basket) and a cooler 54.

The net 52 may be sized and configured to hold board 20 when board 20 is in the folded position.

Figure 5:
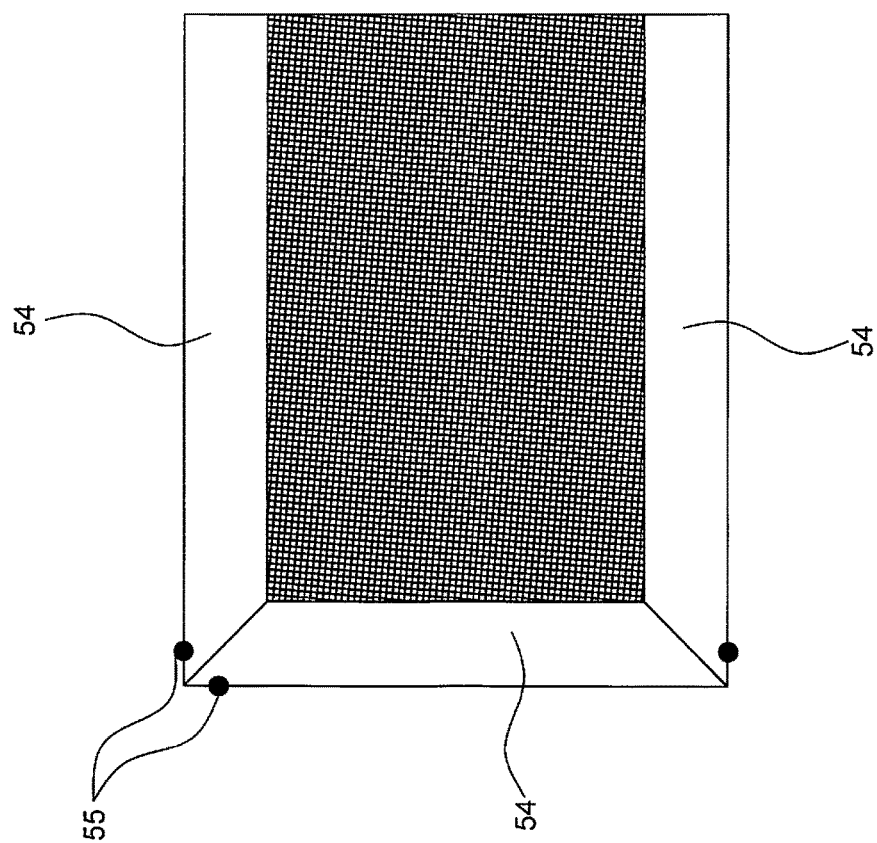
FIG. 5 is a top view of a storage unit of the stroller.

The cooler 54 may be disposed along an outer perimeter of the net 52, at one, two, three, or four sides thereof. FIG. 5 illustrates the storage unit 50 having the cooler 54 disposed at three sides of the net 52, but is not limited thereto. FIG. 5 also illustrates the cooler being 7 inches wide, but it is not limited to this size.

The cooler 54 may include at least one set of zippers 55 to allow a user to insert cans and bottles inside the cooler 54. The cooler 54 may be configured to be insulated to keep cans and bottles cold when inserted therein. The zippers 55 may extend along entire lengths of the sides of the cooler 54.

In an embodiment, board 20 also includes safety straps (not shown) secured to board 20. Safety straps may be used to strap a child to board 20 to prevent the child from falling from board 20 while child is on board. Safety straps may have buckles or other fasteners at one end to allow user to firmly strap child onto board.

To use board 20, user may remove board from net 52. User may then unfold board 20 and secure board 20 to armrests 48 of stroller 40. If desired, user may strap child to board 20 using safety straps. Once user is finished using board 20, user can fold board 20 at hinge 32 so the first and second portions 24, 28 of board 20 are disposed on top of one another. User can then replace board 20 in net 52 below seat 44 of stroller 40.

Board 20 can be used on single strollers, double strollers, and triple strollers, or on any stroller that has armrests.

Although exemplary embodiments of the invention have been shown and described, all the terms used herein are descriptive rather than limiting, and many changes, modifications, and substitutions may be made by one having ordinary skill in the art without departing from the spirit and scope of the invention.

The invention claimed is:

1. A portable changing table comprising:
    a foldable board having a first section and a second section;
    the first section and second section each having a top and a bottom surface;
    at least one attachment device disposed at a center portion of the bottom surface of each of the first section and the second section;
    wherein the attachment devices are configured to be attached to respective mating attachment devices disposed on a stroller;
    wherein the board has a folded position and an unfolded position;
    wherein, in the folded position, the bottom surface of the first section folds flat against the bottom surface of the second section, such that the attachment devices are obscured; and
    wherein, in the unfolded position, the first section and the second section lay flat adjacent to one another to form a rectangular surface such that the top surfaces are configured to receive an infant thereupon.

2. The portable changing table of claim 1, wherein the attachment devices are configured to secure the board to a stroller.

3. The portable changing table of claim 1, wherein the board has a padded surface.

4. The portable changing table of claim 1, wherein the board has a waterproof surface.

5. The portable changing table of claim 1, further comprising straps secured to the board; wherein the straps are configured to be used to secure a child to the board.

6. The portable changing table of claim 1, wherein the first section and the second section are generally of the same shape and size.

7. The portable changing table of claim 1, wherein the first section and the second section are each about 1.5 feet by 1.5 feet (46 cm by 46 cm), and wherein, in an unfolded position, the board is about 1.5 feet by three feet (46 cm by 92 cm).

8. The portable changing table of claim 1, further comprising a hinge; wherein the hinge extends between the first section and the second section, holding the first section to the second section and allowing the first section to fold over the second section.

9. A stroller with a portable changing table comprising:
    a stroller comprising a seat having two sides and at least two armrests; wherein the armrests extend parallel to and higher than at least a portion of the sides of the seat;
    a net suspended below at least a portion of the seat;
    a foldable board having a first section and a second section;
    the first section and second section each having a top and a bottom surface;
    at least one attachment device disposed at a center portion of the bottom surface of each of the first section and the second section;
    wherein the attachment devices are configured to be attached to respective mating attachment devices disposed on the stroller;
    wherein the board has a folded position and an unfolded position;
    wherein, in the folded position, the bottom surface of the first section folds flat against the bottom surface of the second section, such that the attachment devices are obscured;
    wherein, in the unfolded position, the first section and the second section lay flat adjacent to one another to form a rectangular surface such that the top surfaces are configured to receive an infant thereupon; and
    wherein the board is configured to fit within the net when the board is in a folded position.

10. The stroller with a portable changing table of claim 9, wherein the net is secured to and suspended below at least a portion of the seat.

11. The stroller with a portable changing table of claim 9, wherein the respective mating attachment devices are a plurality of attachment devices secured to the armrests; wherein the attachment devices on the armrests are configured to mate with the attachment devices on the board, thereby allowing the board to be secured to the armrests.

12. A stroller with a portable changing table for an infant, comprising:
- a seat;
- a plurality of armrests disposed on each side of the seat to receive at least a portion of an object thereupon;
- a board removably disposed on a top surface of each of the plurality of armrests, the board comprising:
  - a first section and a second section;
  - the first section and second section each having a top and a bottom surface;
  - at least one attachment device disposed at a center portion of the bottom surface of each of the first section and the second section;
  - wherein the attachment devices are configured to be attached to respective mating attachment devices disposed on the stroller;
  - the second section pivotally disposed on at least a portion of a side of the first section to pivot at least partially toward the first section in a first position, and to pivot at least partially away from the first section in a second position;
  - wherein, in the first position, the bottom surface of the first section folds flat against the bottom surface of the second section, such that the attachment devices are obscured;
  - wherein, in the second position, a length of the board is greater than a distance between each of the plurality of armrests, such that the top surfaces of the board are configured to receive the infant thereupon in the second position; and
- a storage unit disposed on at least a portion of the stroller beneath the seat, the storage unit comprising:
  - a net to store the board therein, and
  - a cooler disposed along at least a portion of a perimeter of the net to store at least one of a can and a bottle therein.

* * * * *